US008922960B2

(12) United States Patent
Van Wijmeersch (10) Patent No.: US 8,922,960 B2
(45) Date of Patent: Dec. 30, 2014

(54) ELECTROSTATIC DISCHARGE DEVICE WITH ADJUSTABLE TRIGGER VOLTAGE

(75) Inventor: Sven Van Wijmeersch, Brakel (BE)

(73) Assignee: Sofics BVBA, Gistel (BE)

( * ) Notice: Subject to any disclaimer, the term of this patent is extended or adjusted under 35 U.S.C. 154(b) by 928 days.

(21) Appl. No.: 12/499,538

(22) Filed: Jul. 8, 2009

(65) Prior Publication Data

US 2010/0027173 A1  Feb. 4, 2010

Related U.S. Application Data

(60) Provisional application No. 61/078,845, filed on Jul. 8, 2008.

(51) Int. Cl.
*H02H 9/00* (2006.01)
*H02H 9/04* (2006.01)
*H02H 3/00* (2006.01)

(52) U.S. Cl.
CPC .............. *H02H 9/046* (2013.01); *H02H 3/006* (2013.01)
USPC ........................................... 361/56

(58) Field of Classification Search
USPC ........................................... 361/56
See application file for complete search history.

(56) References Cited

U.S. PATENT DOCUMENTS

| 5,400,202 | A * | 3/1995 | Metz et al. ...................... 361/56 |
| 6,747,501 | B2 * | 6/2004 | Ker et al. ....................... 327/310 |
| 6,919,602 | B2 * | 7/2005 | Lin et al. ....................... 257/360 |
| 7,933,107 | B2 * | 4/2011 | Sugahara ....................... 361/111 |
| 2003/0039084 | A1 * | 2/2003 | Hatzilambrou et al. ........ 361/56 |
| 2005/0275984 | A1 * | 12/2005 | Liu et al. ......................... 361/56 |
| 2006/0209478 | A1 * | 9/2006 | Arai et al. ....................... 361/56 |
| 2008/0144244 | A1 * | 6/2008 | Van Camp ....................... 361/56 |
| 2009/0086391 | A1 * | 4/2009 | Gauthier et al. ................ 361/56 |
| 2009/0091871 | A1 * | 4/2009 | Hung .............................. 361/56 |

* cited by examiner

*Primary Examiner* — Rexford Barnie
*Assistant Examiner* — Ann Hoang
(74) *Attorney, Agent, or Firm* — Volpe and Koenig, P.C.

(57) ABSTRACT

An improved ESD protection circuit having an ESD device and a triggering device to provide a continuously adjustable trigger voltage. This can be accomplished by various techniques such as placing a selected number of triggering elements in series, modifying the gate control circuitry and varying the size of the triggering elements.

31 Claims, 8 Drawing Sheets

ELECTROSTATIC DISCHARGE DEVICE WITH ADJUSTABLE TRIGGER VOLTAGE

CROSS REFERENCES

This patent application claims the benefit of U.S. Provisional Application Ser. No. 61/078,845 filed Jul. 8, 2008, the contents of which are incorporated by reference herein.

FIELD OF THE INVENTION

The present invention generally relates to circuits that provide improved electrostatic discharge (ESD) protection, and more particularly to method and apparatus for providing an improved voltage level based ESD protection circuit such that trigger voltage can be tuned to a desired value of a low trigger voltage and a low leakage current.

BACKGROUND OF THE INVENTION

ESD protection devices need to shunt current during ESD circumstances, but need to appear like an open during normal chip operation. This is achieved through the so-called trigger elements, a.k.a. ESD detectors. The trigger element needs to fulfill many requirements such as it must never trigger below the supply voltage (+margin) to prevent latch-up (if no transients); it must not trigger on transients caused by switching, noise, current injection or any other event during the normal operation of the chip; it must trigger before the failure voltage (−margin) of the devices it needs to protect and the leakage at the supply voltage needs to be within certain predefined limits. In many ESD applications a design window of an ESD protection circuit is so small that finding a trigger element which fits within this window fulfilling the above discussed requirements is very difficult.

One of the ESD protection circuits includes voltage level detection devices or circuits that need to be biased at a certain voltage level (trigger voltage) in order to conduct. These can be further divided into snapback devices (devices that go to a low-ohmic state with a voltage offset lower than the trigger voltage) and non-snapback devices that go to a low-ohmic state with a voltage offset equal to the trigger voltage. However, many of such voltage level detection devices trigger at a too high voltage and others have a too high leakage. An example of this is an ESD protection of an output driver . . . . The output NMOS transistor can be quickly turned. So, in the worst case the NMOS will trigger at its holding voltage. This means it is impossible to use a gate-grounded NMOS (ggNMOS) or any device that uses a ggNMOS as trigger element to protect such an output unless the failure voltage of the output driver is greater than the trigger voltage of the ggNMOS. In the case where the supply voltage is low enough, a diode chain (or any device that uses a diode chain as trigger element) could be used as ESD protection. However, this is limited by leakage considerations. The voltage drop over each diode should be sufficiently small so that hardly any leakage current flows through it. For higher supply voltages this can become a problem.

The solution to the above problem is generally solved by another type of ESD protection circuit that includes a transient detection circuit that only conducts when the voltage changes with time fast enough and can trigger at a low voltage level. An example of such a transient circuit is a form of RC controlled MOS device (or any device triggered by it). As long as a MOS operates in MOS-mode (if the current density stays below about 0.5 mA/um for an NMOS) the voltage over the MOS will be below its holding voltage. Therefore, it can be used to protect a device that can fails below the holding voltage of the ESD clamp (or at Vt2<Vt1). Despite the overall effectiveness of this approach there are some downsides and limitations. First, this approach consumes a lot of area. The RC chain is usually very large, and the MOS itself has to be large enough to be able to conduct enough current in MOS mode (either all ESD current or just the (possibly high) trigger current of another device). Another downside is that the time constant is influenced by parasitic capacitances along the chip. These may slow down the pulse and delay triggering, increasing the trigger voltage as well. Also noise or spikes on the powerline will induce an extra leakage path. Finally, when using RC controlled MOS devices as a trigger element of another device (e.g. an SCR), and when too many clamps are placed in parallel, it is possible that trigger current will become very high. This generally does not cause any problems for core protection, as the voltage over the parallel clamps will never exceed the maximum voltage over a single clamp, but it can create a problem for IO protection, where typically dual diodes are used as protection. All ESD current when stressing the IO has to go through one of these diodes. If the current demand of the parallel trigger elements is too high the total voltage over the sensitive node may become too high. This is the combined result of all current going through the diode's resistance and not enough of the current running through each individual clamp circuit preventing the clamps from triggering. Thus, several deficiencies with this transient detection circuit are that it has larger area and includes latch-up risk and further only one clamp can trigger at a low voltage because the transient dissipates after triggering.

Thus, there is a need in the art to provide a protection technique for ESD protection that overcomes the disadvantages of the above discussed prior art by providing a voltage level detection trigger device such that the trigger voltage can be easily altered to a desired value while maintaining a low leakage current.

SUMMARY OF THE INVENTION

In one embodiment of the present invention, there is provided an electrostatic discharge (ESD) protection device comprising an ESD circuit coupled between a first voltage potential and a second voltage potential. The device also comprises a trigger circuit having at least two triggering elements coupled between the first voltage potential and the second voltage potential. The trigger circuit is coupled to the ESD circuit. The device also comprises a voltage divider coupled between the first voltage potential and the second voltage potential. The voltage divider is coupled to at least one of the triggering element to control triggering voltage of the triggering circuit.

In another embodiment of the present invention, there is provided an electrostatic discharge (ESD) protection device comprising an ESD circuit coupled between a first voltage potential and a second voltage potential. The device also comprises a first ESD control device comprising a first trigger circuit having at least two triggering elements and a first voltage divider coupled to at least one of the triggering element of the first trigger circuit to control triggering voltage of the first triggering circuit. The device also comprises a second ESD control device comprising a second trigger circuit having at least two triggering elements and a second voltage divider coupled to at least one of the triggering elements of the second trigger circuit to control a triggering voltage of the second triggering circuit. The first and second ESD control device is coupled to each other and one of the first and second control devices is coupled to the ESD circuit.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention.

DETAILED DESCRIPTION OF THE INVENTION

The present invention provides an ESD protection device that is suitable for all voltage domains. More specifically, the invention disclosed herein provides a voltage level detection trigger device of which the trigger voltage can be flexibly altered between the minimum and maximum voltage, while the leakage is low. Also, the trigger device of the present invention is not influenced negatively by transient events and the area of the trigger element is low for its effectiveness.

Figure 1:
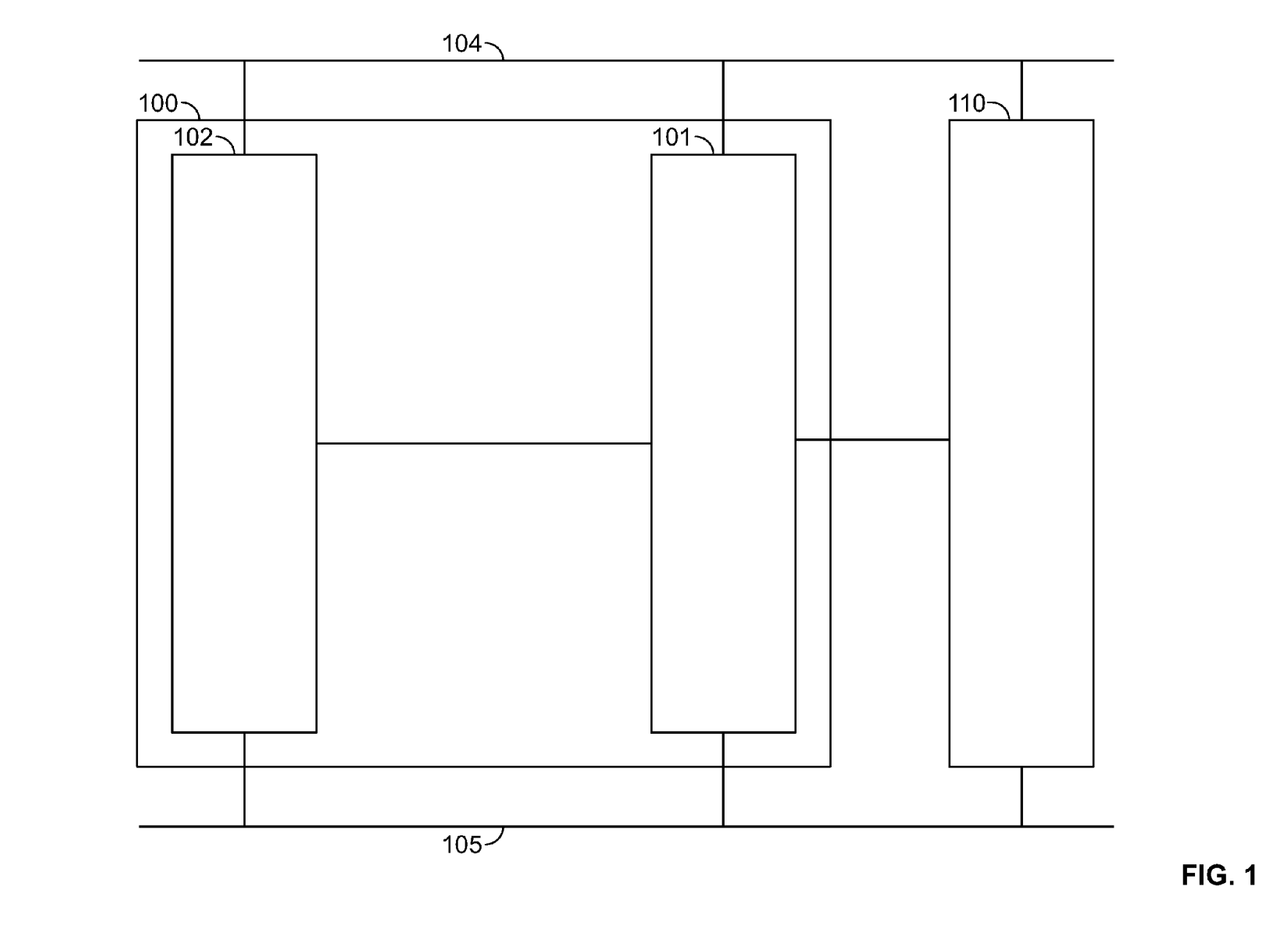
FIG. 1 illustrates an ESD protection device in accordance with an embodiment of the present invention.

Referring to FIG. 1, there is illustrated a block diagram of an ESD control device 100 in accordance with one embodiment of the current invention. The device 100 comprises a voltage divider circuit 102 coupled to a trigger circuit 101. The voltage divider circuit 102 functions to divide the voltage between the anode and the cathode and control the voltage at the trigger circuit 101. The trigger circuit 101 functions to conduct current to trigger a ESD circuit 110 during an ESD event. The trigger circuit 101 and voltage divider 102 will be described in greater detail herein below.

As shown in FIG. 1, one end of the trigger circuit 101, voltage divider 102 and the ESD clamp circuit 110 is coupled to a first voltage potential 104 and the other end is coupled to a second voltage potential 105. The voltage divider 102 preferably has three terminals such that the first terminal is coupled to the first voltage potential 104, second terminal is coupled to the second voltage potential 105 and a third terminal is coupled to a trigger element of the trigger circuit 101. It is known to one skilled in the art that the first voltage potential 104 can be a voltage supply (Vdd) or ground or an input/output pad, or connected to any internal circuitry such as an inter-power domain interface. Similarly, the second voltage potential 105 can preferably be ground, or an input/output pad, or connected to any internal circuitry. However, for the purpose of the invention as described, the first voltage potential 104 is preferably connected to the voltage supply and the second voltage potential 105 is preferably connected to the ground.

Figure 2:
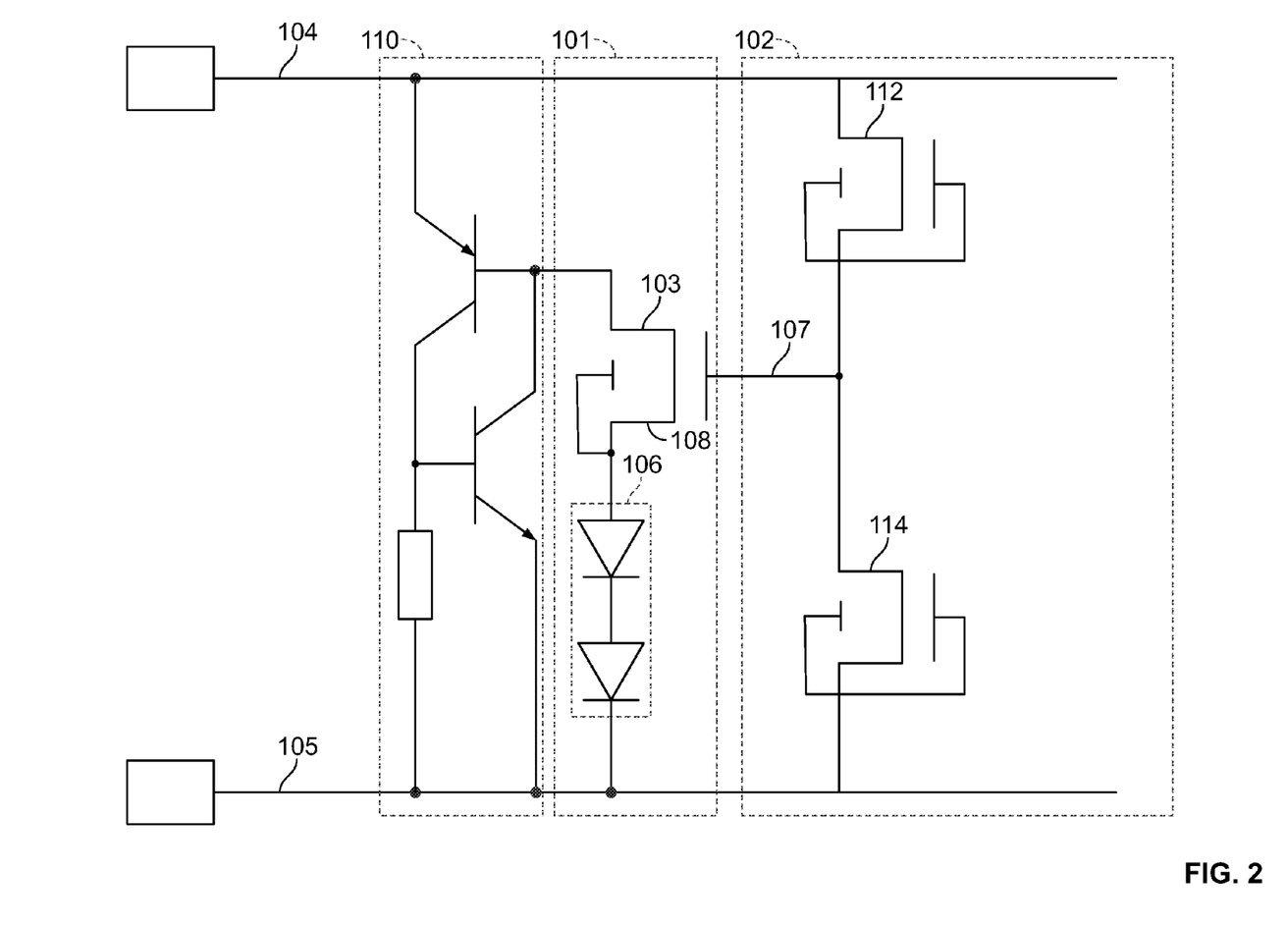
FIG. 2 illustrates circuit elements of the block diagram of the ESD protection circuit of FIG. 1 in accordance with a preferred embodiment of the present invention.

Referring to FIG. 2, there are shown circuit elements of the block diagram of the ESD control device 100 and the ESD clamp circuit 110 of FIG. 1 in accordance with a preferred embodiment of the present invention. The ESD clamp circuit 110 preferably comprises an SCR, although other elements such as a bipolar transistor, Darlington transistor or a MOS can also be used. As a preferred embodiment of the trigger circuit 101 consists of an active element, for example, a trigger NMOS 103 and a passive element, for example pumping diodes 106 as shown in FIG. 2. The voltage divider 102 consists of elements 112 and 114. Element 108 is a node between the NMOS 103 and the diode chain 106 and element 107 is node to gate of the NMOS 103. Even though in this embodiment, trigger element 103 is an NMOS, one of ordinary skill in the art would appreciate that the trigger element can also be a PMOS. Furthermore, if PMOS is the trigger element 103, then the element 106 may also be preferably placed at the source of the PMOS. Furthermore, the number of diodes in diode chain 106 as shown in FIG. 2 is variable and depends on the desired properties of the trigger circuit. Although, FIG. 2 illustrates the trigger circuit 101 to be a combination of NMOS and diodes, one of ordinary skill in the art would appreciate that trigger circuit may preferably consists of other elements such as diodes, inverters, resistor, MOS, MOS diodes, and the like or any combination of these elements. For example element 106 may also include a resistor and/or a MOS. In case of a MOS as an example, the gate of the MOS may be coupled to various elements for example, source of the MOS, or node 107 or the divider circuit 102. In another example, node of the diode chain 106 is coupled to the divider circuit 102.

As shown in the embodiment of FIG. 2, elements 112 and 114 are capacitor dividers of NMOS implementation between the two capacitors to divide the voltage between the anode and the cathode to a certain value. Also, only two elements, NMOS 112 and 114 are illustrated as voltage dividers, however, one of ordinary skill will appreciate that more than two elements in series could be used. It is noted that even though NMOS devices are used as voltage dividers, one of ordinary skill in the art would appreciate that circuit 112 and 114 may preferably consists of other elements such as resistors, PMOS devices, capacitors such as a varactor, an N-doped capacitor (NCAP), a metal oxide metal (MOM) capacitor, a metal insulator metal (MIM) capacitor, parallel connection of resistor and capacitor, reverse biased diodes, inverters and like or combination of these elements.

According to one embodiment of the present invention, parameters such as number of triggering elements such as diodes in the example of FIG. 2 and ratio of the voltage of the divider devices will influence on the trigger voltage of the circuit 102 as will be described in greater detail below.

Since in the example of FIG. 2, the voltage dividers 112 and 114 are used capacitors, it is know in the art that the voltage across the capacitor devices is inversely proportion to the capacitance values. Alternatively, if the elements 112 and 114 were resistors, the voltage across the resistor devices would be directly proportion to the resistance values. So, depending on the relative sizes of the elements 112 and 114, the voltage at the gate node 107 will be a fraction of the total voltage over the device at node 105. If for example, the voltage on gate 107 of the NMOS 103 becomes higher than the sum of the voltage on the node 108 (i.e. source of NMOS 103) and the NMOS' threshold voltage (Vt), the NMOS 103 will start to conduct. Since current flowing through the NMOS 103 also flows through the diodes 106, a voltage (Vt) will build up over the latter resulting in an increase in voltage at node 108. Consequently, as long as the voltage on gate 107 is not high to compensate for the build-in voltage of the diodes 106, there will be no current flow, and thus the NMOS 103 will not conduct. Thus, the objective of the present invention is to design the voltage/capacitor divider 112 and 114 and select the number of diodes preferably in the range of 1 through 10 diodes such that voltage at node 107 must be below the triggering voltage i.e. 1.7V during normal operation. This would prevent both the NMOS 103 and the diode chain 106 to conduct current during normal operation resulting in lower current leakage.

Referring back to FIG. 2, in one example, there are two diodes 106, NMOS 112 and 114 have the same size, thus the voltage divider 102 ratio is 1:1. The minimum voltage at the source 108 in order for current to flow is two times the build-in voltage of the diode, i.e. Vbi (.about. 0.7V), which is 1.4V. If the NMOS 103 has a Vt of 0.3V then 1.7V (triggering voltage) is needed at gate 107 to make the NMOS 103 conduct current. If 1.7V is at node 107 then that means 3.4V is required at Vdd supply node 104 for the SCR 110 to trigger (voltage divider with a ratio of 1:1). However, if higher trigger current is needed to trigger SCR 110, then NMOS 103 and the diodes 106 will need to conduct even higher current, which could result in high overshoot voltage. In order to prevent the high overshoot and increase the turn-on speed of the diodes 106, the NMOS 103 and the diodes 106 will preferably need to be laid out and shaped wider. The overshoot can be calculated with the resistance of the diodes and the amount of current needed to trigger the ESD clamp 110. For a lower overshoot the resistance must be lowered by increasing the width of the trigger elements. Clearly, the trigger voltage will also preferably depend on the resistance of the NMOS 103 and the diode 106 of the trigger circuit 101. Thus, the tailoring of the trigger circuit's parameters will allow for fine tuning the trigger characteristics of the SCR 110.

As discussed above, one of the parameters that influences the trigger voltage is the number of diodes. During normal operation, voltage at source node 108 needs to be higher than the gate voltage at node 107 in order to prevent triggering of the NMOS 103 and the diode chain 106. Yet during ESD event, the gate voltage at node 107 will be higher (due to increase of the voltage at node 104) which turns on the combination of the NMOS 103 and the diode chain 106 to conduct current to trigger the SCR 110. By increasing the number of diodes 106, the voltage required at the gate node 107 to trigger element NMOS 103 to conduct current also increases. So, number of diodes required in the diode chain 106 can preferably be selected (for example in the range of 1 to 10 diodes) both during normal operation and during ESD event.

Also, a parameter, the voltage ratio of the trigger voltage divider (112, 114) is a factor that determines the multiplication of the minimum voltage over the diodes since it is effectively a trigger diode multiplier. So, for example, if the ratio of the voltage divider is 1 and you need 1.4V at the source node 108 to trigger the diodes 106, then the total voltage needed to trigger the SCR is one times 1.4V plus the gate voltage at node 107. If for example, the ratio is 2 then you need two times the 1.4V (2.8V) at the source node 108 to trigger the diodes 106, then the total voltage needed to trigger the SCR will be 2.8V plus two times the gate voltage at node 107.

One of other parameters that may also preferably influence the trigger voltage is the capacitance size of the voltage divider 102. So, depending on the size of the capacitance of NMOS 103, the capacitance size of the NMOS 112 and 114 of the voltage divider is preferably determined. In one implementation, the capacitance size (width) of the voltage divider 112 and 114 is same as that of the trigger NMOS 103. In another implementation, capacitance size (width) of the voltage divider 112 and 114 can be based on the voltage required at gate node 107 for the NMOS 103 to conduct current. Another parameter is preferably a size of the trigger NMOS 103. The wider the size of the NMOS 103, the lower the trigger voltage/overshoot. The width of the NMOS may be in the range of 3-160 micrometer, preferably 20 to 80 micrometers. Note that this range is simply one example and the values of the width may be larger or smaller depending on the technology.

In general the following equation can be stated:

$$V104 = (V108 + Vth) \cdot \frac{W112 + W114}{W112} \quad (1)$$

where V104 is the voltage at node 104, V108 is the voltage at node 108, W112 is the width of divider element 112, W114 is the width of divider element 114 and Vth is the threshold voltage of MOS device 103. This equation expresses the connection between the voltage at node 104 and the voltage at node 108. The relation is governed by a factor corresponding to the divider ratio (W112/(W112+W114)) and a term corresponding to the threshold voltage of the MOS device (Vth).

There are three conditions related to the ESD operation. The first condition is that during operation of the chip under normal circumstances, leakage of the device should be minimal. This means that the voltage over the string of diodes 106 should be below a maximum value corresponding to a maximum allowed leakage. The second condition is that, during an ESD event, the voltage at the anode 104 of the ESD clamp 110 should never exceed the maximum allowed voltage (failure voltage). A third condition is that the ESD clamp 110 should not trigger below a minimum trigger voltage ($Q \cdot V_{sup}$) which is larger than the supply voltage and determined by external factors such as maximum latchup test voltage or maximum overvoltage. The three conditions can be written as the following expressions (according to the equation 1):

$$V_{sup} < (n \cdot V_{max1} + Vth) \cdot 1/F \quad (2)$$

$$Q \cdot V_{sup} < (n \cdot V_{bi} + Vth) \cdot 1/F \quad (3)$$

$$V_{max} > (n \cdot V_{bi} + Vth) \cdot 1/F \quad (4)$$

where Vsup is the supply voltage, Vth is the threshold voltage of the (N)MOS, Vbi is the built-in voltage of the diodes, n is the number of diodes, Vmax1 is the maximum allowed voltage over the diodes corresponding to maximum allowed leakage (this value is normally between 0.3V and 0.45V), Vmax is the maximum allowed voltage at the node under protection F is the divider ratio such as F=A/(A+B), where A is the width of a first (group of) element(s) of the voltage divider (W112) and B is the width of a second (group of) element(s) of the voltage divider (W114). A range of values can be determined so that the trigger voltage and leakage fulfill the three conditions stated above. Thus, the three expressions above determine the solution space for combinations of n and F which fulfill the three conditions.

Besides the parameters discussed above, another parameter that influences the trigger voltage is bulk connections of the NMOS 103 devices. Lower voltage potential of the bulk of the NMOS 103 will increase the threshold voltage of the NMOS, which will result in an increase in trigger voltage (combination of NMOS and diodes). Note that not only is the bulk connected to the source of the NMOS 103 as illustrated in FIG. 2, but also may be connected to ground or between one of the diodes (or other elements) in element 106. If the trigger MOS 103 is a PMOS, the bulk must not be connected to a lower potential but to a higher potential or even the positive potential 104.

Although as shown in FIG. 2, the voltage divider 102 is coupled directly to the first potential 104 and the second potential 105, the voltage divider 102 may also be coupled to the first potential 104 through another circuit such as a base-emitter junction of the PNP of the SCR 110 or alternatively the voltage divider 102 may also be coupled to the second potential 105 through another circuit such as a base-emitter junction of the NPN of the SCR 110.

Even though FIG. 2 represents an SCR with the trigger circuit 101 between the base of the PNP of the SCR 110 and the second potential 105, it is noted that the trigger circuit 101 may alternatively be placed between the first potential 104 and the base of the NPN of the SCR 110.

Figure 3:
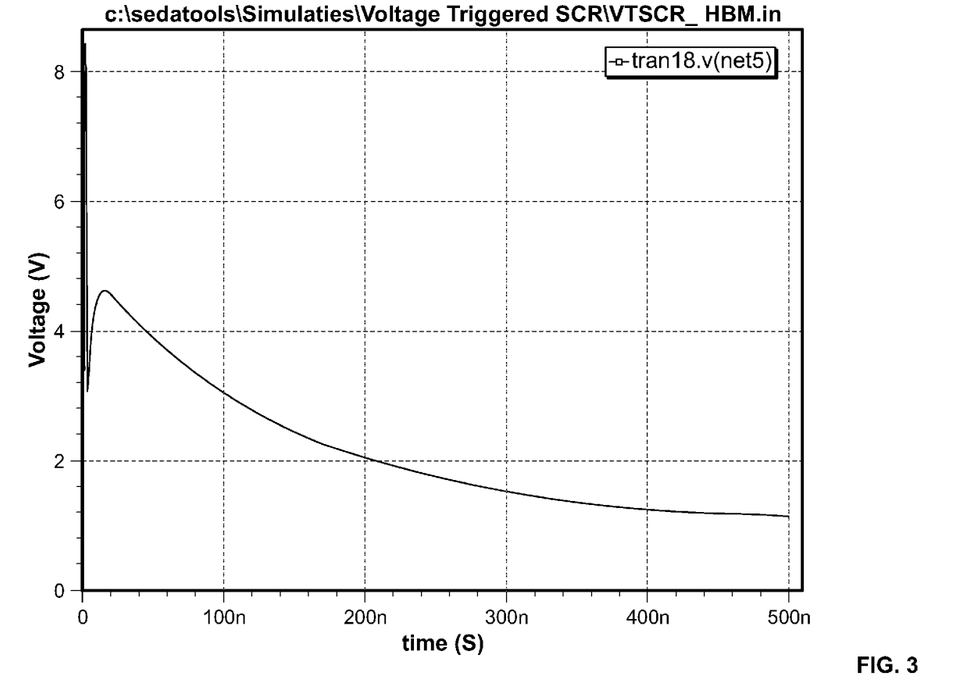
FIG. 3 illustrates a graphical representation of trigger voltage in accordance with a embodiment of the present invention.

Although not shown, as an example the diode chain 106 may preferably include three trigger diodes with the NMOS 112 and 114 having the same size, so the voltage divider ratio is 1:1 and the Vt is about 0.23V. FIG. 3 illustrates a graphical representation of the trigger voltage with three diode chain. As shown in FIG. 3, the NMOS overshoot is lowered. Simulations in FIG. 3 show that SCR is successfully triggered, and that the trigger voltage can be adjusted by applying the correct multiplication ratio and number of diodes. Although, not shown, number of fingers in the trigger NMOS 103 may preferably be increased to further reduce the overshoot voltage at the trigger element 101.

Figure 4:
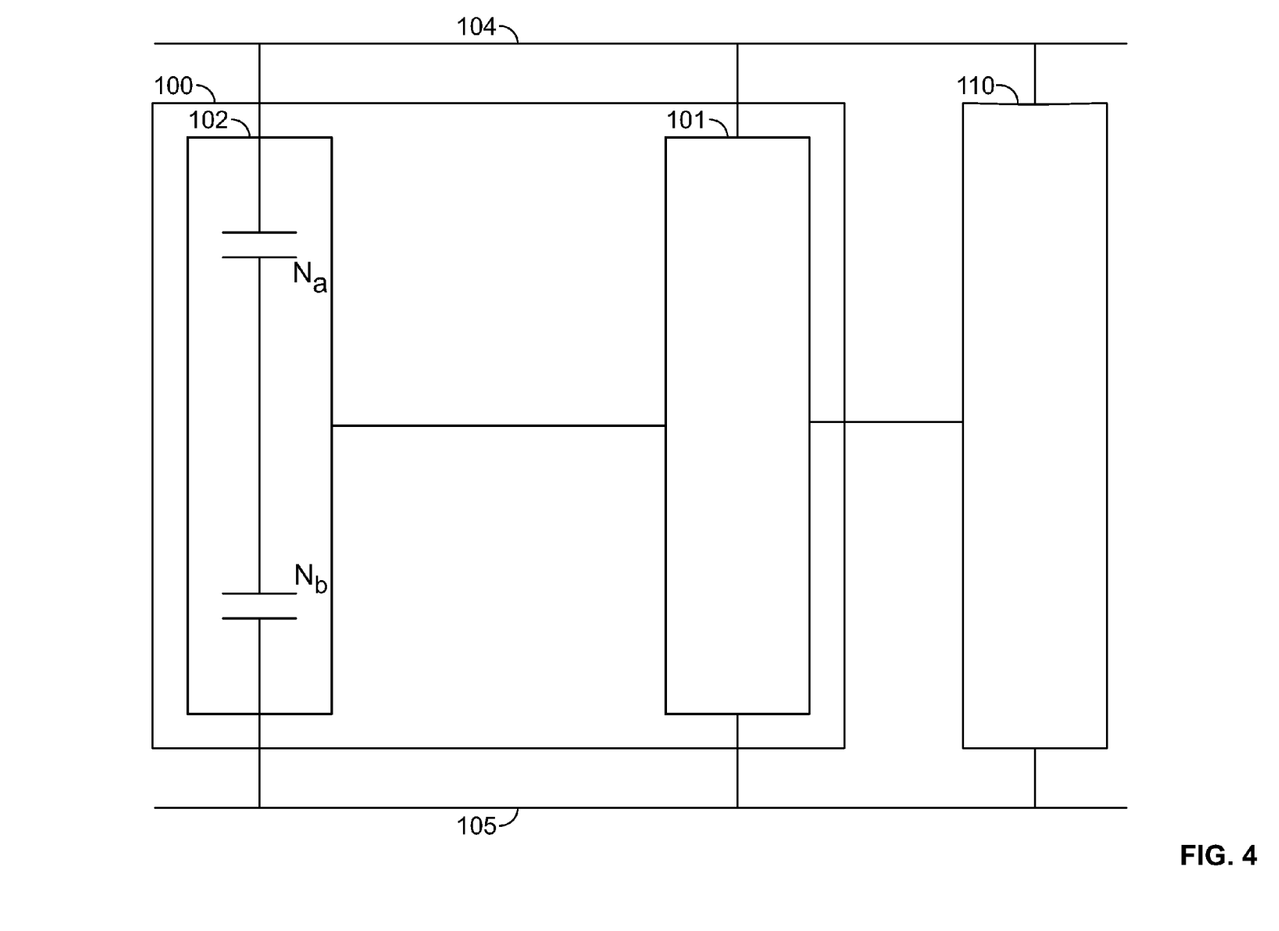
FIG. 4 illustrates an ESD protection device in accordance with an alternate embodiment of the present invention.

Referring to FIG. 4, there is illustrated a preferred embodiment of the present invention of FIG. 1 in which the voltage divider 102 includes a series connection of capacitors. One of the advantages of using the capacitors is that there is no junction divider and thus no leakage of the junction, which in turn results in an improved voltage divider ratio.

Figure 5:
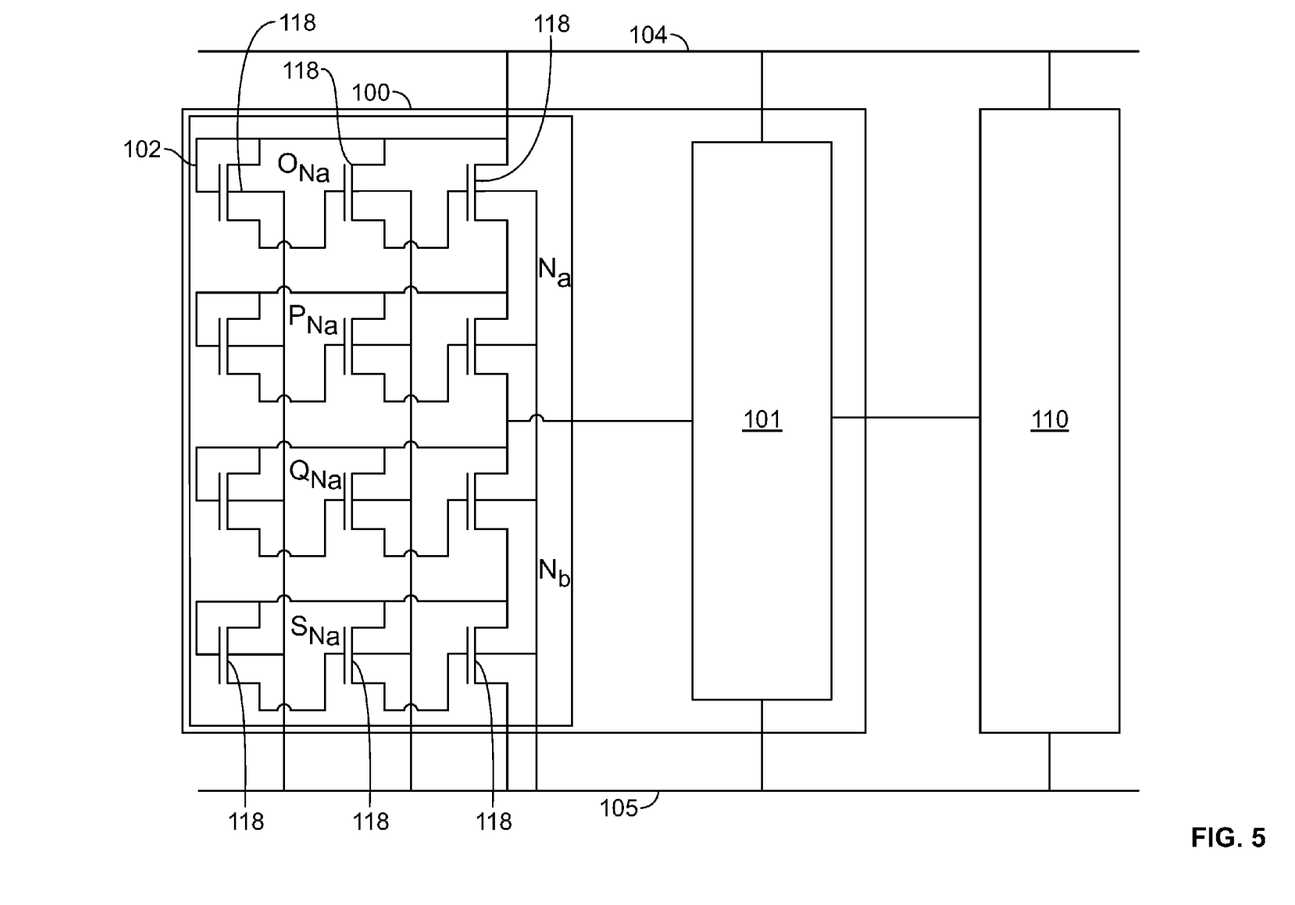
FIG. 5 illustrates an ESD protection device in accordance with a preferred embodiment of the present invention.

Referring to FIG. 5, there is illustrated a preferred embodiment of the present invention of FIG. 1 in which the voltage divider 102 includes a series connection of NMOS devices 118. Each of these NMOS devices 118 have another device 118 connected between its gate and drain, which is used as voltage shift. So, the voltage at the source of the chain of Ona NMOS device 118 is the supply voltage Vdd 104 minus 1 to 2 times the Vt of the NMOS. This source voltage of Ona NMOS 118 is applied to the gate of the next chain of Pna NMOS device 118. The source voltage of this chain of Pna NMOS device 118 will again follow its gate voltage, which will be the supply voltage Vdd 104 minus 2 to 4 times the Vt of the NMOS. So the amount of voltage that is subtracted increases with every chain of NMOS device until you have reached back at the Ona NMOS 118 at which the source voltage of the Ona NMOS 118 will be Vdd 104 minus 1 to 2 times the Vt times the number of NMOS devices at the gate. So, by connecting these MOS devices in series, a voltage shift is introduced. So, the voltage at the node 107 connected to 101 will be determined by number of NMOS 118 devices that are between the Vdd 104 and the node 107 and the number of NMOS 118 devices that are between the Vss 105 and the node 107. One of the advantages is less leakage current is more elements in series which can be made of very small size. Note that the bulk of the different MOS is connected to ground in this example of FIG. 5, but it may also be connected to the source of the MOS or other intermediate voltage level. Also, NMOS may preferably be replaced by a PMOS device or even a combination of a NMOS and a PMOS. Also, FIG. 5 shows four MOS in series with at each MOS and two MOS are connected to the gate. The number of MOS connected in series and connected to the gate may be more or less depending on the desired voltage divider.

Figure 6:
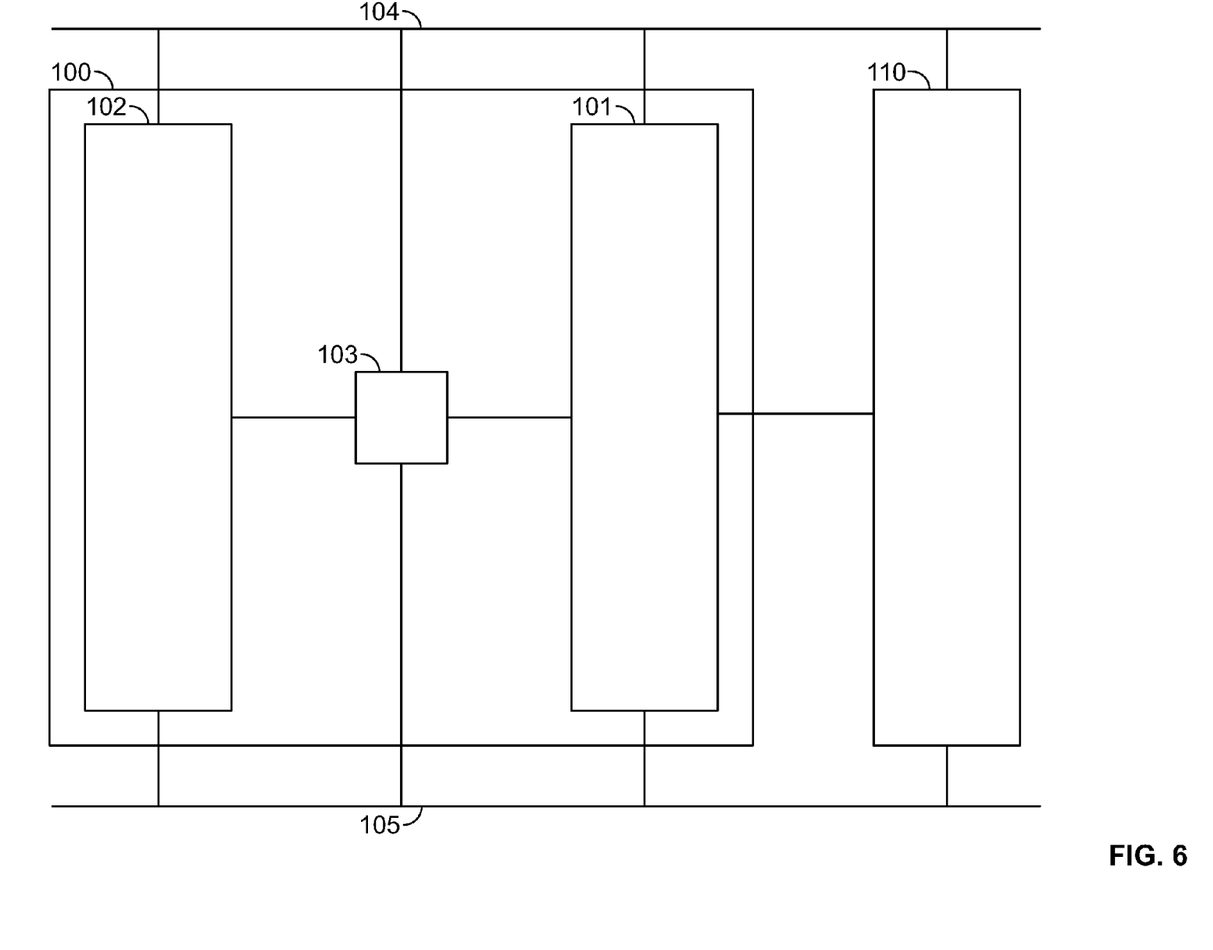
FIG. 6 illustrates ESD protection device in accordance with an alternate embodiment of the present invention.

Referring now to FIG. 6, there is illustrated an alternate embodiment of the present invention of FIG. 1 by adding a switch regulating buffer circuit 103 coupled directly between the voltage divider 102 and the trigger circuit 101. The switch regulating buffer circuit may include elements such as inverters, passgate(s), resistor(s), diode(s) or combinations of these elements.

Figure 6A:
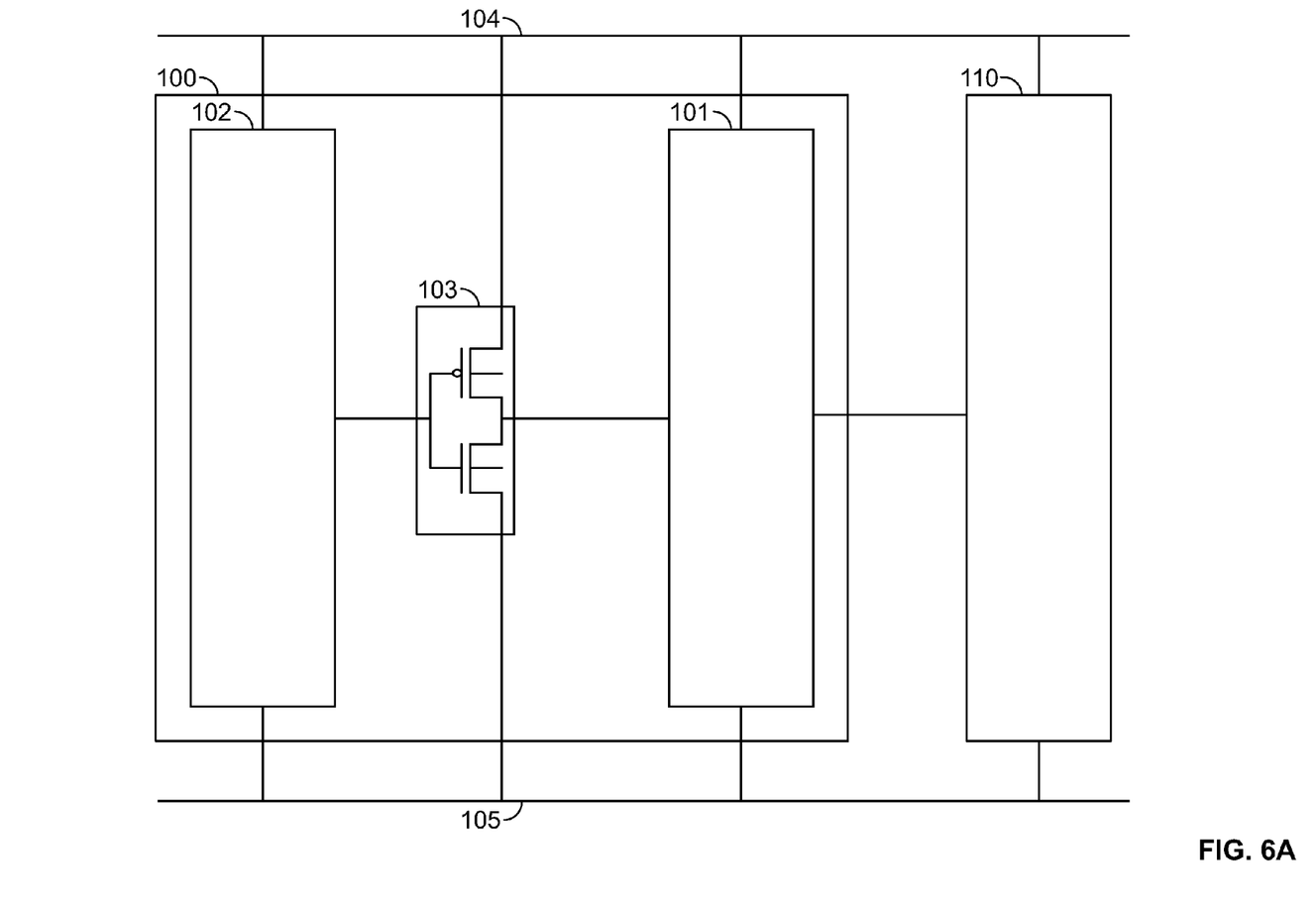
FIG. 6A illustrates an ESD protection device of FIG. 6 in accordance with a preferred embodiment of the present invention.

As an example, the switch regulating buffer circuit 103 is an inverter as shown in FIG. 6A. By adding the inverter, the input will be the detector which will change to high or low output depending on the state of the voltage divider circuit 102. The advantage of using an inverter is to change the voltage level at the input of trigger circuit 101. This threshold voltage is the minimum input voltage that is needed to switch the inverter 103 from a low output state to a high output state or vice versa. A low voltage input at the inverter 103 will set the output voltage high. When the output voltage of the inverter 103 is high, the trigger circuit 101 will be charged up to conduct current which in turn will trigger the ESD clamp 110. Then, at a certain voltage, (i.e. the threshold voltage of the inverter 103) the inverter 103 will switch the output voltage from a high value to a low value. So, by adding the inverter, the voltage over the voltage divider 102 can be altered to be tuned at the gate of inverter 103 to be able to easily turn on the trigger element 101.

Figure 7:
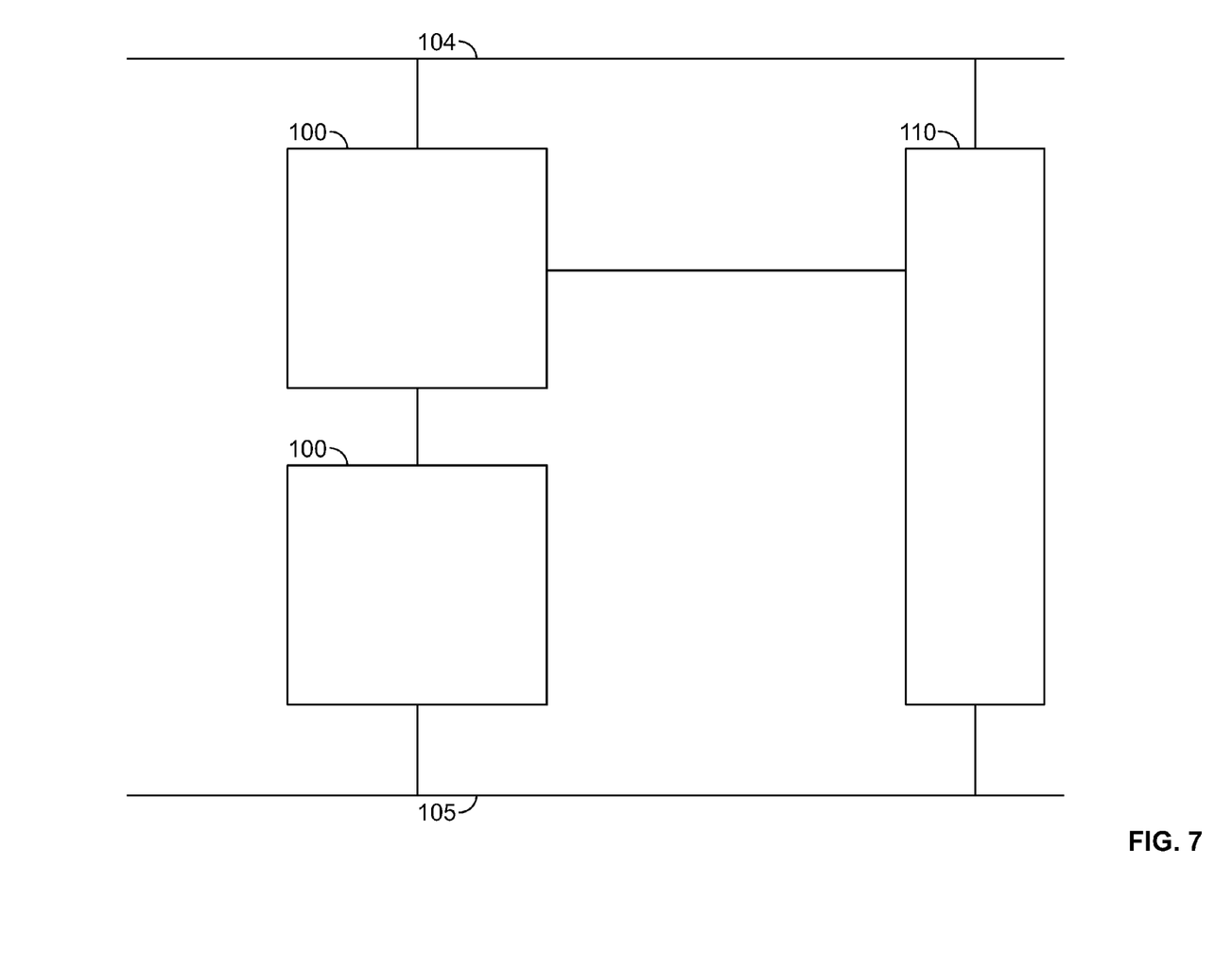
FIG. 7 illustrates ESD protection device in accordance with another embodiment of the present invention.

FIG. 7 illustrates another embodiment of the present invention in which at least two of the ESD control devices 100 are coupled to each other as shown. So, there would be two of the voltage divider circuits 102 and two of the trigger circuits 101 functioning together to trigger the ESD clamp 110. One of the advantages of this technique is that elements in the circuits may preferably be of different voltage domains. So, elements from lower voltage domain can be used in the higher voltage domain. By stacking the circuits as shown in FIG. 7, the voltage over each element will be limited to lower voltage, i.e. below the failure voltage. With the elements from a lower domain, a more specific trigger voltage can be chosen or a smaller area can be used (smaller elements). Note that even though only two ESD protection devices 100 are shown in FIG. 7, there may preferably include more than two devices 100 coupled to each other.

Although various embodiments that incorporate the teachings of the present invention have been shown and described in detail herein, those skilled in the art can readily devise many other varied embodiments that still incorporate these teachings without departing from the spirit and the scope of the invention.

The invention claimed is:

1. An electrostatic discharge (ESD) protection device, comprising:
   a silicon controlled rectifier (SCR) coupled between a first voltage potential and a second voltage potential, the SCR including a PNP transistor and an NPN transistor; and
   a first ESD control device including:
      a trigger circuit coupled between a base of the PNP transistor of the SCR and the second voltage potential, the trigger circuit including a first N-type metal oxide semiconductor (NMOS) device and a serial chain of at least one diode, wherein the serial chain includes a first terminal at a first end of the serial chain and a second terminal at a second end of the serial chain, a source of the first NMOS device is serially coupled to the first terminal of the serial chain, the second terminal of the serial chain is coupled to the second voltage potential, a base of the PNP transistor of the SCR is coupled to a drain of the first NMOS device, and wherein all of a current flowing through the source of the first NMOS device flows through the first terminal of the serial chain; and a voltage divider coupled between the first voltage potential and the second voltage potential and coupled to a gate of the first NMOS device, wherein the voltage divider includes at least two dividing elements, wherein all of the at least two dividing elements are one of a same type selected from a group consisting essentially of a resistor, a MOS device, a diode, and a capacitive element, and further wherein the voltage divider is configured such that:

a first dividing element of the at least two dividing elements is coupled between the first voltage potential and the gate of the first NMOS device; and a second dividing element of the at least two dividing elements is coupled between the second voltage potential and the gate of the first NMOS device; and wherein the voltage divider is configured to provide a divided portion of a voltage difference between the first voltage potential and the second voltage potential to the gate of the first NMOS device, wherein the divided portion is a function of a respective same physical dimension of the at least two dividing elements, and further wherein the respective same physical dimensions are sized such that the divided portion is less than a source voltage of the first NMOS device to keep off the first NMOS device during normal operation and further wherein the divided portion turns on the first NMOS device during an ESD event.

2. The ESD protection device of claim 1 wherein the serial chain of at least one diode includes at least two serially coupled diodes.

3. The ESD protection device of claim 1 wherein the at least two dividing elements are MOS devices, and further wherein terminals of all MOS devices of the at least two dividing elements are coupled in a same manner such that all MOS devices of the at least two dividing elements function in a same operation mode.

4. The ESD protection circuit of claim 1 wherein the voltage divider includes n MOS devices coupled between the first voltage potential and the trigger circuit, wherein n is an integer greater than or equal to 2, and further wherein the n MOS devices are configured such that:

each MOS device of the n MOS devices includes a source, a drain, a gate, and a bulk;

the source of a first MOS device of the n MOS devices is coupled to the trigger circuit and the drain of the first MOS device of the n MOS devices is coupled to the first voltage potential;

all drains of the n MOS devices are coupled together;

the gate of a j-th MOS device of the n MOS devices is coupled to the source of a j+1-th MOS device of the n MOS devices, wherein j is an integer between and including 1 and n−1; and the gate of the n-th MOS device is coupled to the drain of the n-th MOS device.

5. The ESD protection device of claim 4 wherein the bulk of each of the n MOS devices is coupled to one of the first voltage potential and the second voltage potential.

6. The ESD protection device of claim 4 wherein the bulk of each of the n MOS devices is coupled to the respective source of the MOS device.

7. The ESD protection circuit of claim 1 wherein the voltage divider includes n MOS devices coupled between the trigger circuit and the second voltage potential, wherein n is an integer greater than or equal to 2, and further wherein the n MOS devices are configured such that:

each MOS device of the n MOS devices includes a source, a drain, a gate, and a bulk;

the drain of a first MOS device of the n MOS devices is coupled to the trigger circuit and the source of the first MOS device of the n MOS devices is coupled to the second voltage potential;

all drains of the n MOS devices are coupled together;

the gate of a j-th MOS device of the n MOS devices is coupled to the source of a j+1-th MOS device of the n MOS devices, wherein j is an integer between and including 1 and n−1; and the gate of the n-th MOS device is coupled to the drain of the n-th MOS device.

8. The ESD protection device of claim 7 wherein the bulk of each of the n MOS devices is coupled to one of the first voltage potential and the second voltage potential.

9. The ESD protection device of claim 7 wherein the bulk of each of the n MOS devices is coupled to the respective source of the MOS device.

10. The ESD protection device of claim 1 wherein the voltage divider includes at least one MOS device coupled between the trigger circuit and one of the first voltage potential and the second voltage potential.

11. The ESD protection circuit of claim 1 wherein each of the at least two dividing elements of the voltage divider is a capacitor.

12. The ESD protection device of claim 11 wherein each of the capacitors comprises at least one of a varactor, an N-doped capacitor (NCAP), a metal oxide metal (MOM) capacitor, and a metal insulator metal (MIM) capacitor.

13. The ESD protection circuit of claim 1 wherein each of the at least two dividing elements of the voltage divider is a MOS device.

14. The ESD protection circuit of claim 1 further comprising a buffer circuit coupled between the voltage divider and the trigger circuit.

15. The ESD protection circuit of claim 1, wherein the respective same physical dimension of the at least two dividing elements is a respective width, wherein the width of the first dividing element of the at least two dividing elements is a width A, the width of the second dividing element of the at least two dividing elements is a width B, and wherein the voltage divider is further configured to provide the divided portion such that:

$$V_{sup} < (n \cdot V_{max1} + Vth) \cdot 1/F$$

$$Q \cdot V_{sup} < (n \cdot V_{bi} + Vth) \cdot 1/F$$

$$V_{max} > (n \cdot V_{bi} + Vth) \cdot 1/F$$

where $V_{sup}$ is the voltage difference between the first voltage potential and the second voltage potential during normal operation, Vth is a threshold voltage of the first NMOS device, $V_{bi}$ is a built-in voltage of a diode of the serial chain of at least one diode, n is the number of diodes of the serial chain of at least one diode, $V_{max1}$ is a maximum allowed voltage over each diode of the serial chain of at least one diode corresponding to maximum allowed leakage, $Q \cdot V_{sup}$ is a minimum trigger voltage which is larger than $V_{sup}$ and determined by external factors such as maximum latchup test voltage or maximum overvoltage, $V_{max}$ is a maximum allowed voltage at a node under protection, and F is a divider ratio wherein F=A/(A+B).

16. The ESD protection circuit of claim 15 wherein the number of diodes is between and includes 1 to 10.

17. The ESD protection circuit of claim 15 wherein a width of the first NMOS device is between and includes 3 to 160 micrometers.

18. The ESD protection circuit of claim 17 wherein the width of the first NMOS device is between and includes 20 to 80 micrometers.

19. The ESD protection circuit of claim 1, further comprising:
   a second ESD control device including a second trigger circuit having at least two triggering elements and a second voltage divider coupled to at least one of the triggering elements to control a triggering voltage of the second trigger circuit; and wherein the second ESD control device is coupled between the first ESD control device and the second voltage potential.

20. An electrostatic discharge (ESD) protection device, comprising:
   a silicon controlled rectifier (SCR) coupled between a first voltage potential and a second voltage potential, the SCR including a PNP transistor and an NPN transistor; and
   a first ESD control device including:
      a trigger circuit coupled between the first voltage potential and a base of the NPN transistor of the SCR, the trigger circuit including a first N-type metal oxide semiconductor (NMOS) device and a serial chain of at least one diode, wherein the serial chain includes a first terminal at a first end of the serial chain and a second terminal at a second end of the serial chain, a source of the first NMOS device is serially coupled to the first terminal of the serial chain, the second terminal of the serial chain is coupled to the base of the NPN transistor of the SCR, a drain of the first NMOS device is coupled to the first voltage potential, and wherein all of a current flowing through the source of the first NMOS device flows through the first terminal of the serial chain; and
      a voltage divider coupled between the first voltage potential and the second voltage potential and coupled to a gate of the first NMOS device, wherein the voltage divider includes at least two dividing elements, wherein all of the at least two dividing elements are one of a same type selected from a group consisting essentially of a resistor, a MOS device, a diode, and a capacitive element, and further wherein the voltage divider is configured such that:
         a first dividing element of the at least two dividing elements is coupled between the first voltage potential and the gate of the first NMOS device; and
         a second dividing element of the at least two dividing elements is coupled between the second voltage potential and the gate of the first NMOS device; and
      wherein the voltage divider is configured to provide a divided portion of a voltage difference between the first voltage potential and the second voltage potential to the gate of the first NMOS device, wherein the divided portion is a function of a respective same physical dimension of the two dividing elements, and further wherein the respective same physical dimensions are sized such that the divided portion is less than a source voltage of the first NMOS device to keep off the first NMOS device during normal operation and further wherein the divided portion turns on the first NMOS device during an ESD event.

21. The ESD protection device of claim 20 wherein the at least two dividing elements are MOS devices, and further wherein terminals of all MOS devices of the at least two dividing elements are coupled in a same manner such that all MOS devices of the at least two dividing elements function in a same operation mode.

22. The ESD protection circuit of claim 20 wherein the voltage divider includes n MOS devices coupled between the first voltage potential and the trigger circuit, wherein n is an integer greater than or equal to 2, and further wherein the n MOS devices are configured such that:
   each MOS device of the n MOS devices includes a source, a drain, a gate, and a bulk;
   the source of a first MOS device of the n MOS devices is coupled to the trigger circuit and the drain of the first MOS device of the n MOS devices is coupled to the first voltage potential;
   all drains of the n MOS devices are coupled together;
   the gate of a j-th MOS device of the n MOS devices is coupled to the source of a j+1-th MOS device of the n MOS devices, wherein j is an integer between and including 1 and n−1; and
   the gate of the n-th MOS device is coupled to the drain of the n-th MOS device.

23. The ESD protection circuit of claim 20 wherein the voltage divider includes n MOS devices coupled between the trigger circuit and the second voltage potential, wherein n is an integer greater than or equal to 2, and further wherein the n MOS devices are configured such that:
   each MOS device of the n MOS devices includes a source, a drain, a gate, and a bulk;
   the drain of a first MOS device of the n MOS devices is coupled to the trigger circuit and the source of the first MOS device of the n MOS devices is coupled to the second voltage potential;
   all drains of the n MOS devices are coupled together;
   the gate of a j-th MOS device of the n MOS devices is coupled to the source of a j+1-th MOS device of the n MOS devices, wherein j is an integer between and including 1 and n−1; and
   the gate of the n-th MOS device is coupled to the drain of the n-th MOS device.

24. The ESD protection circuit of claim 20 wherein each of the at least two dividing elements of the voltage divider is a capacitor.

25. The ESD protection circuit of claim 20, wherein the respective same physical dimension of the at least two dividing elements is a respective width, wherein the width of the first dividing element of the at least two dividing elements is a width A, the width of the second dividing element of the at least two dividing elements is a width B, and wherein the voltage divider is further configured to provide the divided portion such that:

$$V_{sup} < (n \cdot V_{max1} + Vth) \cdot 1/F$$

$$Q \cdot V_{sup} < (n \cdot V_{bi} + Vth) \cdot 1/F$$

$$V_{max} > (n \cdot V_{bi} + Vth) \cdot 1/F$$

where $V_{sup}$ is the voltage difference between the first voltage potential and the second voltage potential during normal operation, Vth is a threshold voltage of the first NMOS device, $V_{bi}$ is a built-in voltage of a diode of the serial chain of at least one diode, n is the number of diodes of the serial chain of at least one diode, $V_{max1}$ is a maximum allowed voltage over each diode of the serial chain of at least one diode corresponding to maximum allowed leakage, $Q \cdot V_{sup}$ is a minimum trigger voltage which is larger than $V_{sup}$ and determined by external factors such as maximum latchup test voltage or maximum overvoltage, $V_{max}$ is a maximum allowed voltage at a node under protection, and F is a divider ratio wherein F=A/(A+B).

26. An electrostatic discharge (ESD) protection device, comprising:
a silicon controlled rectifier (SCR) coupled between a first voltage potential and a second voltage potential, the SCR including a PNP transistor and an NPN transistor; and
a first ESD control device including:
a trigger circuit coupled between the first voltage potential and a base of the NPN transistor of the SCR, the trigger circuit including a first P-type metal oxide semiconductor (PMOS) device and a serial chain of at least one diode, wherein the serial chain includes a first terminal at a first end of the serial chain and a second terminal at a second end of the serial chain, the first terminal of the serial chain is coupled to the first voltage potential, the second terminal of the serial chain is serially coupled to a source of the first PMOS device, a drain of the first PMOS device is coupled to the base of the NPN transistor of the SCR, and wherein all of a current flowing through the source of the first PMOS device flows through the second terminal of the serial chain; and
a voltage divider coupled between the first voltage potential and the second voltage potential and coupled to a gate of the first PMOS device, wherein the voltage divider includes at least two dividing elements, wherein all of the at least two dividing elements are one of a same type selected from a group consisting essentially of a resistor, a MOS device, a diode, and a capacitive element, and further wherein the voltage divider is configured such that:
a first dividing element of the at least two dividing elements is coupled between the first voltage potential and the gate of the first PMOS device; and
a second dividing element of the at least two dividing elements is coupled between the second voltage potential and the gate of the first PMOS device; and
wherein the voltage divider is configured to provide a divided portion of a voltage difference between the first voltage potential and the second voltage potential to the gate of the first PMOS device, wherein the divided portion is a function of a respective same physical dimension of the two dividing elements, and further wherein the respective same physical dimensions are sized such that the divided portion is greater than a source voltage of the first PMOS device to keep off the first PMOS device during normal operation and further wherein the divided portion turns on the first PMOS device during an ESD event.

27. The ESD protection device of claim 26 wherein the at least two dividing elements are MOS devices, and further wherein terminals of all MOS devices of the at least two dividing elements are coupled in a same manner such that all MOS devices of the at least two dividing elements function in a same operation mode.

28. The ESD protection circuit of claim 26 wherein the voltage divider includes n MOS devices coupled between the first voltage potential and the trigger circuit, wherein n is an integer greater than or equal to 2, and further wherein the n MOS devices are configured such that:
each MOS device of the n MOS devices includes a source, a drain, a gate, and a bulk;
the source of a first MOS device of the n MOS devices is coupled to the trigger circuit and the drain of the first MOS device of the n MOS devices is coupled to the first voltage potential;
all drains of the n MOS devices are coupled together;
the gate of a j-th MOS device of the n MOS devices is coupled to the source of a j+1-th MOS device of the n MOS devices, wherein j is an integer between and including 1 and n−1; and
the gate of the n-th MOS device is coupled to the drain of the n-th MOS device.

29. The ESD protection circuit of claim 26 wherein the voltage divider includes n MOS devices coupled between the trigger circuit and the second voltage potential, wherein n is an integer greater than or equal to 2, and further wherein the n MOS devices are configured such that:
each MOS device of the n MOS devices includes a source, a drain, a gate, and a bulk;
the drain of a first MOS device of the n MOS devices is coupled to the trigger circuit and the source of the first MOS device of the n MOS devices is coupled to the second voltage potential;
all drains of the n MOS devices are coupled together;
the gate of a j-th MOS device of the n MOS devices is coupled to the source of a j+1-th MOS device of the n MOS devices, wherein j is an integer between and including 1 and n−1; and
the gate of the n-th MOS device is coupled to the drain of the n-th MOS device.

30. The ESD protection circuit of claim 26 wherein each of the at least two dividing elements of the voltage divider is a capacitor.

31. The ESD protection circuit of claim 26, wherein the respective same physical dimension of the at least two dividing elements is a respective width, wherein the width of the first dividing element of the at least two dividing elements is a width A, the width of the second dividing element of the at least two dividing elements is a width B, and wherein the voltage divider is further configured to provide the divided portion such that:

$V_{sup} < (n \cdot V_{max1} + Vth) \cdot 1/F$ $Q \cdot V_{sup} < (n \cdot V_{bi} + Vth) \cdot 1/F$ $V_{max} > (n \cdot V_{bi} + Vth) \cdot 1/F$ where $V_{sup}$ is the voltage difference between the first voltage potential and the second voltage potential during normal operation, Vth is a threshold voltage of the first PMOS device, $V_{bi}$ is a built-in voltage of a diode of the serial chain of at least one diode, n is the number of diodes of the serial chain of at least one diode, $V_{max1}$ is a maximum allowed voltage over each diode of the serial chain of at least one diode corresponding to maximum allowed leakage, $Q \cdot V_{sup}$ is a minimum trigger voltage which is larger than $V_{sup}$ and determined by external factors such as maximum latchup test voltage or maximum overvoltage, $V_{max}$ is a maximum allowed voltage at a node under protection, and F is a divider ratio wherein F=A/(A+B).

* * * * *